(12) United States Patent
Kingston

(10) Patent No.: US 8,215,871 B2
(45) Date of Patent: Jul. 10, 2012

(54) TIDEWAY ANCHOR SYSTEM

(76) Inventor: William Kingston, Dublin (IE)

( * ) Notice: Subject to any disclaimer, the term of this patent is extended or adjusted under 35 U.S.C. 154(b) by 0 days.

(21) Appl. No.: 12/998,037

(22) PCT Filed: Sep. 16, 2009

(86) PCT No.: PCT/IE2009/000065
§ 371 (c)(1),
(2), (4) Date: Mar. 11, 2011

(87) PCT Pub. No.: WO2010/032232
PCT Pub. Date: Mar. 25, 2010

(65) Prior Publication Data
US 2011/0158746 A1    Jun. 30, 2011

(30) Foreign Application Priority Data

Sep. 17, 2008  (GB) ............................. GB0816987.2
May 19, 2009  (GB) ............................. GB0908543.2
Jun. 3, 2009  (GB) ............................. GB0909551.4
Jul. 27, 2009  (GB) ............................. GB0912998.2

(51) Int. Cl.
*E02B 9/08* (2006.01)
*E02D 23/08* (2006.01)
*B63B 1/26* (2006.01)

(52) U.S. Cl. ............. 405/224.1; 405/75; 405/195.1; 405/224; 405/228; 114/274; 114/280

(58) Field of Classification Search ......... 405/195.1, 405/196, 203, 224, 224.1, 24.2, 226, 228; 114/264, 265, 274, 280, 282
See application file for complete search history.

(56) References Cited

U.S. PATENT DOCUMENTS

| | | | |
|---|---|---|---|
| 3,578,266 A * | 5/1971 | Upton | 244/218 |
| 3,602,320 A * | 8/1971 | Howard | 175/8 |
| 4,029,039 A | 6/1977 | Van Heijst | |
| 6,719,496 B1 * | 4/2004 | Von Eberstein | 405/224 |
| 7,275,891 B2 | 10/2007 | Owen | |
| 2005/0286979 A1 * | 12/2005 | Watchorn | 405/224 |
| 2006/0140724 A1 * | 6/2006 | Owen et al. | 405/75 |

FOREIGN PATENT DOCUMENTS

| | | |
|---|---|---|
| CA | 2365650 A1 * | 6/2003 |
| EP | 00045613 | 2/1982 |
| GB | 1131856 | 10/1968 |
| WO | WO 2007086037 | 8/2007 |

* cited by examiner

*Primary Examiner* — David Bagnell
*Assistant Examiner* — Kyle Armstrong

(57) ABSTRACT

A sea bed anchor of the plug-and-socket type, in which the depth of the socket (2) needed to keep the plug in the socket against tidal force is reduced by downwards force from a hydrofoil (5). The same force is used to lock the plug and socket positively together. The effective area of hydrofoils (5) can be increased when the tide is flowing, and reduced when it is not. Downwards force from hydrofoils is also used to enable submersible vessels to drill sockets in rock or to embed suction anchors in sediment.

5 Claims, 6 Drawing Sheets

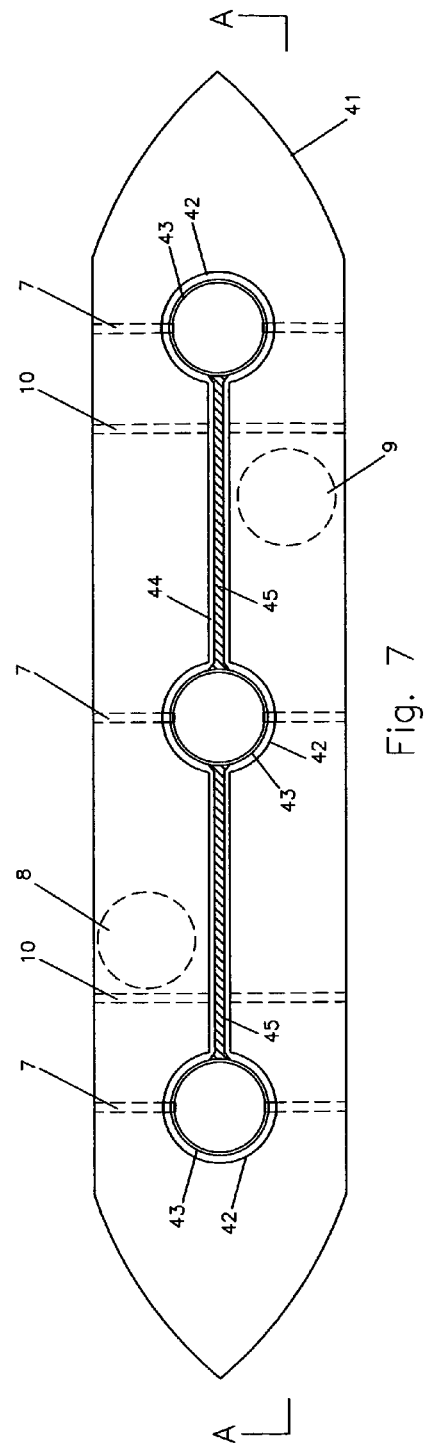
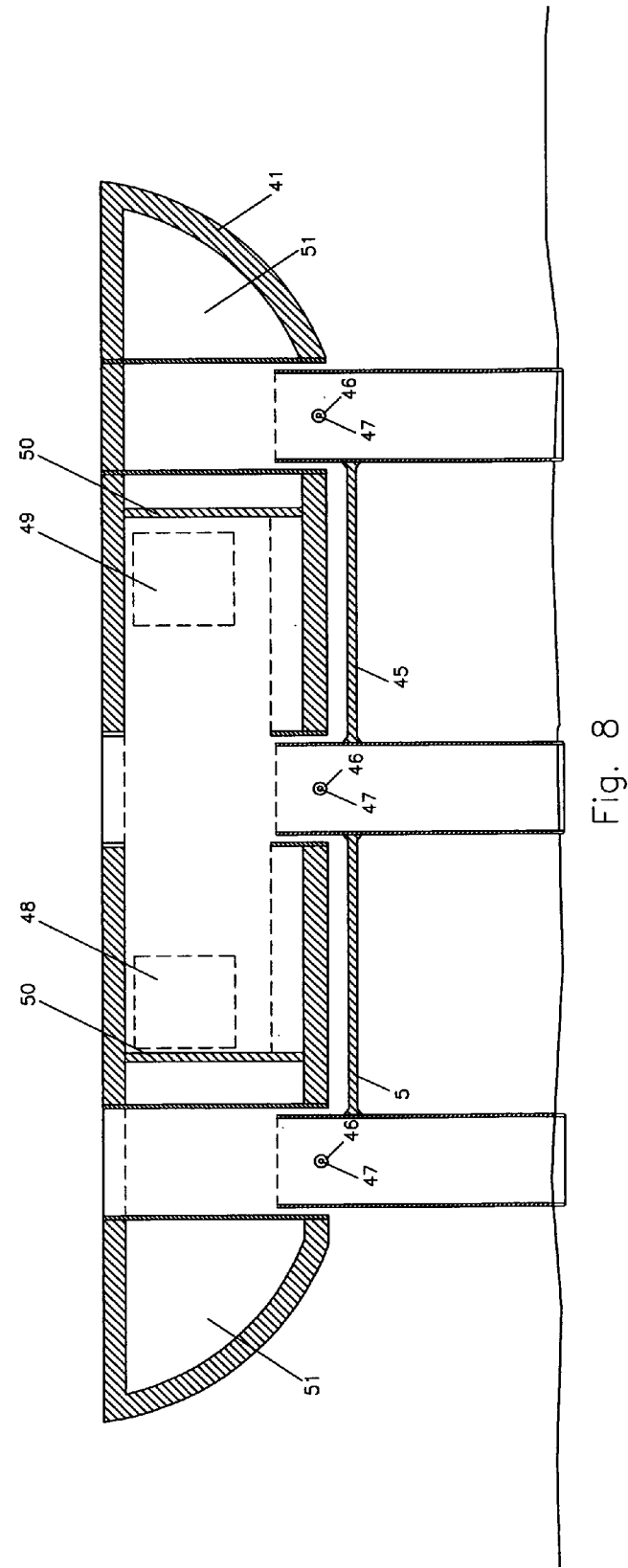

TIDEWAY ANCHOR SYSTEM

BACKGROUND OF THE INVENTION

The lateral force of tidal flow on objects positioned on the sea bed is considerable, and the concept of using the force of the tidal stream itself to counter this force is believed to be found for the first time in my patent disclosure No. GB1131856. More recently, it has been developed further, see U.S. Pat. No. 7,275,891. The following improvement is particularly designed for use with my tidal turbine invention, disclosed in WO2007086037, but of course it also has other applications. It uses a plug and socket type of anchoring, as can be found in the disclosure of EP0045613 (A1). In one version of the method of making components of the invention, means of connecting and disconnecting pumping gear to suction anchors as disclosed in U.S. Pat. No. 6,719,496, are used.

OUTLINE OF THE INVENTION

Economic capture of tidal energy requires that the energy extraction means is securely anchored on the sea bed when the tide is flowing, yet able at the same time to be retrieved easily at a tidal null point for maintenance. This combination of requirements can be achieved by having the turbine attached to a plug which fits into a socket drilled into the sea bed. If the socket is deep enough, the friction between plug and socket, caused by the lateral force of the tide transmitted to the plug, can overcome the vertical component of the tidal force which acts to pull the plug out of the socket. At a tidal null point, the plug and any equipment attached to it, can be lifted out of the socket and removed for maintenance.

The depth of the socket needed to hold the plug against the vertical component of tidal force can be greatly reduced by capturing some of the force of the tide itself to counteract the force acting to separate plug and socket. This invention uses a hydrofoil for this purpose. The depth can be reduced still further by adding a means of positively locking plug and socket together at times of tidal flow, which is also disclosed in this invention. It is essential that any such locking arrangement be completely reliable in operation, since any failure would result either in the equipment attached to the plug being swept away by the tide, or it would be very difficult and expensive to retrieve it from the sea bed for maintenance. This invention also uses a hydrofoil to capture force from the tide itself, which is completely reliable, for both locking and unlocking the component parts of the anchor.

The area of hydrofoil required to provide the required downward force may cause inconvenience when handling the equipment during a maintenance procedure. For this reason, the invention also discloses means of increasing this area when the tide is flowing and reducing it when it is not.

The invention also discloses a method of making the sockets in the sea bed which are an integral part of this method of reliably positioning equipment on it. When it is desired to anchor an object such as a turbine in part of the sea which is subject to strong tides, it is frequently found that these tides have scoured the sea bed down to rock, which has to be penetrated by drilling to provide a strong and permanent anchoring point. Drilling from a surface vessel is particularly difficult because of the force of the tidal flow on the drill string, and this difficulty of course increases with water depth. The invention also overcomes this problem.

It does so by using a submersible vessel which can rest on the sea bed. However, if this is to be able to provide enough reaction force to the resistance of the rock to drilling, it would have to be of very considerable weight. Its mobility would consequently require large ballast tanks and corresponding energy to fill and blow these. The invention largely eliminates the need to expend such energy by using hydrofoils to generate inverse 'lift' from the tidal flow.

Since this flow is attenuated close to the sea bed by boundary layer effects, obtaining enough force from it for drilling purposes may require a large foil area, This is disadvantageous, for example when the vessel is required to be craned into a mother ship on the surface. It can be achieved without this disadvantage by having multiple foils of small wingspan on the upper surface of the vessel, but this brings with it the danger that the foil blades will engage with one another when they rotate in response to change in tidal flow direction. The invention's arrangement for extending the hydrofoils' wingspan when the tide is flowing but retracting it around the tidal change points, overcomes this problem also.

If the sockets which are an integral part of the invention are in softer material than rock, such as sediment, it may be necessary to reinforce their resistance to lateral force. The offshore oil industry makes considerable use of suction embedment pile anchors. The present invention shows a way to make reinforcements of this type for the anchor sockets when the depth of the water is not enough for hydrostatic pressure on its own to drive the anchor into the sea bed, as well as when it is.

DESCRIPTION OF THE DRAWINGS

In the accompanying drawings,

FIG. 7 is a plan view, and

FIG. 8 is a sectional view of the vessel which is used in making the sockets of the invention in the sea-bed when this is of softer material, such as sediment.

DETAILED DESCRIPTION OF THE INVENTION

Figure 1:
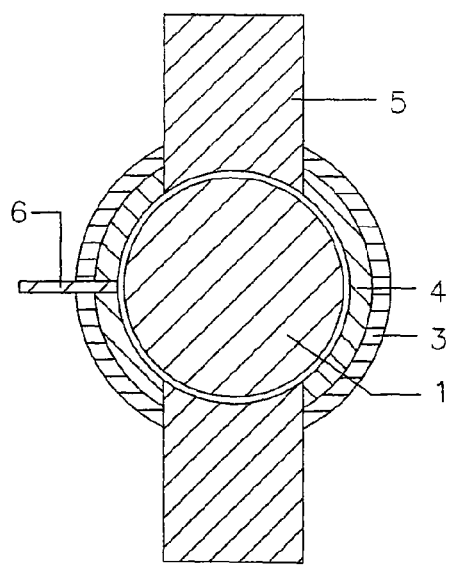
FIG. 1 is a plan view of the invention in its simplest form.
Figure 2:
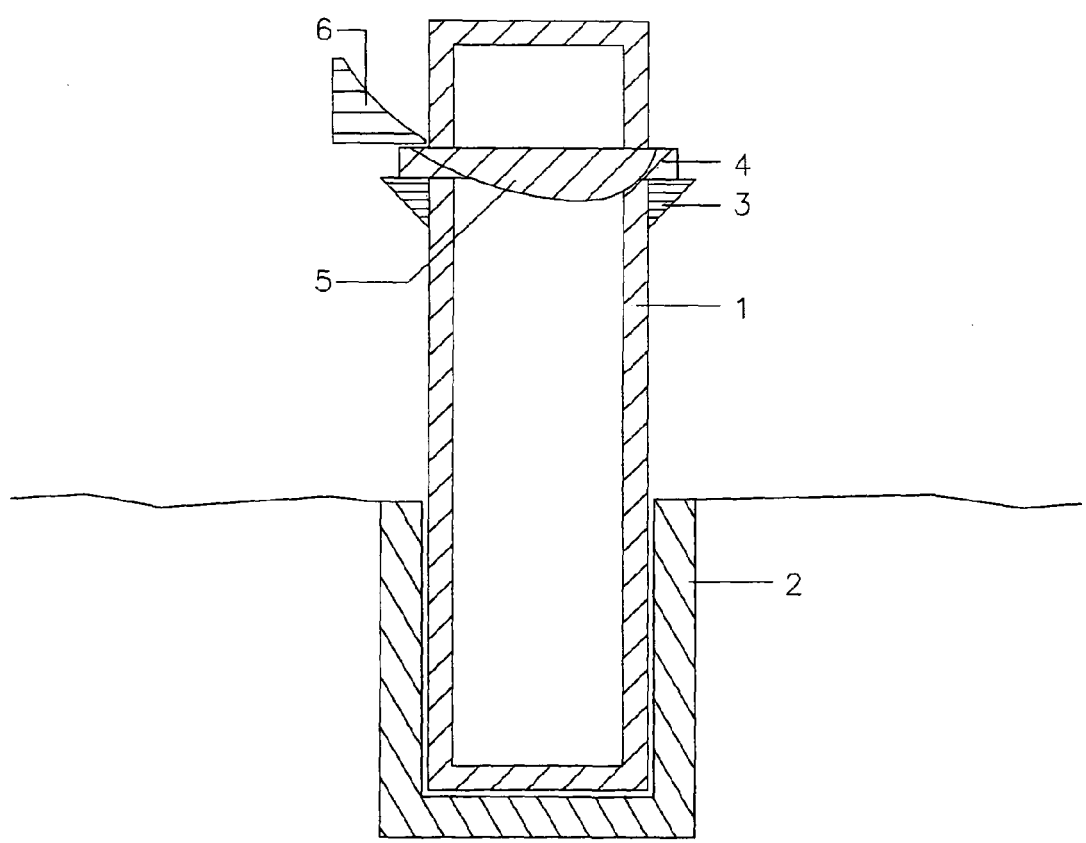
FIG. 2 is a side section of it.

In FIGS. 1 and 2, 1 is a plug to which equipment to be moored in a tidal stream can be attached, which fits into a socket 2 in the sea bed 3 is a supporting collar around the circumference of plug 1, and 4 is a bearing which also fits over plug 1 and runs on collar 3. 5 is a hydrofoil of non-symmetrical section designed to generate 'inverse lift,' attached to bearing 4, and 6 is a vertical tailplane, on which the force of the tidal stream acts to rotate bearing 4 with its attached hydrofoil 5 so that the hydrofoil's leading edge faces the tidal stream.

In operation, plug 1 is placed in its socket on the sea bed during a tidal change period, when there is little or no water movement. When the tide begins to flow, it acts upon tailplane 6 to turn the hydrofoil 5 to face the current. As the current flow increases, hydrofoil 5 generates a downwards force which acts on plug 1 through bearing 4 and collar 3. This force counteracts the tendency of the vertical component of the tidal force, in its action on equipment attached to the top of support 1, to pull support 1 out of socket 2. As a result, socket 2 need not be as deep nor as strongly constructed as it would have to be without hydrofoil anchoring.

Figure 3:
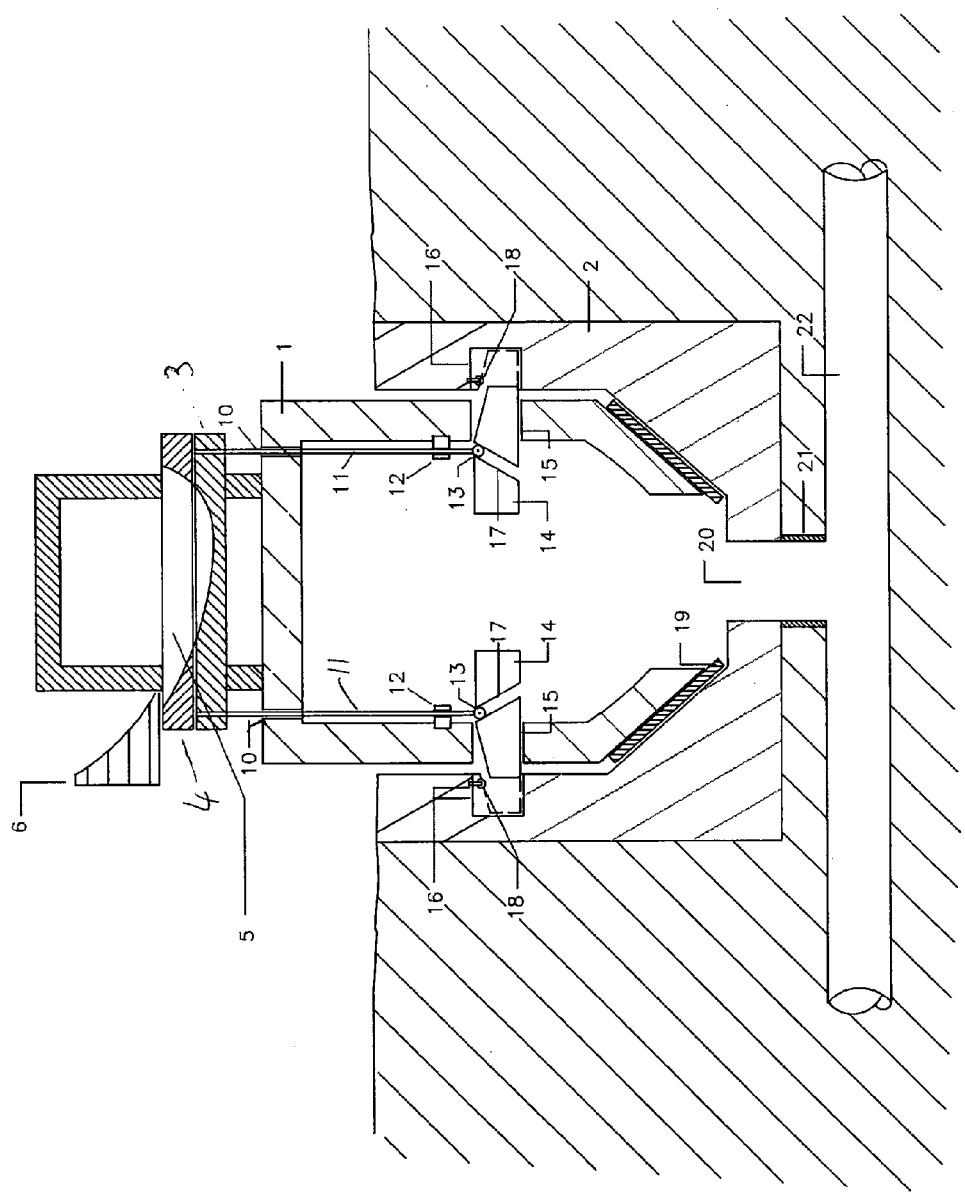
FIG. 3 is a section of a more sophisticated version of the invention, which also incorporates means of positively locking and sealing plug and socket together.

Socket 2 can be even less deep if the locking mechanism illustrated in FIG. 3 is used. In this figure, collar 3 is marginally buoyant but with its capacity to move vertically limited to the length of travel of rods 11, 11 attached to it and movable through holes 10, 10 in the top of plug 1 and guides 12, 12, which are attached to the inside wall of plug 1. 13, 13 are rollers on the other ends of rods 11, and 14, 14 are a pair of locking bars which are shaped to slide in slots 15, 15, cut in the walls of plug 1 and also in slots 16, 16, cut in the walls of socket 2. 17, 17 are angled slots in locking bars 14 within which rollers 13, 13 can move to cause lateral movement of these bars. The upper surfaces of bars 14, 14 are chamfered, so that when they encounter rollers 18, 18, attached to the upper surfaces of slots 15, 15, they cause plug 1 to be forced downwards within socket 2, compressing flexible seal 19 between them at the lower end of plug 1. This is to enable a water pump (not shown) within plug 1, to force water efficiently through orifice 20 in plug 1, tube 21 and conduit 22 to where its kinetic energy can be used, when the tide is running. Around the tidal null point, downwards pressure from the hydrofoil ceases, so it is free to move upwards under its slight positive buoyancy, pulling rods 11, 11 upwards to withdraw locking bars 14, 14 from slots 15, 15.

Figure 4:
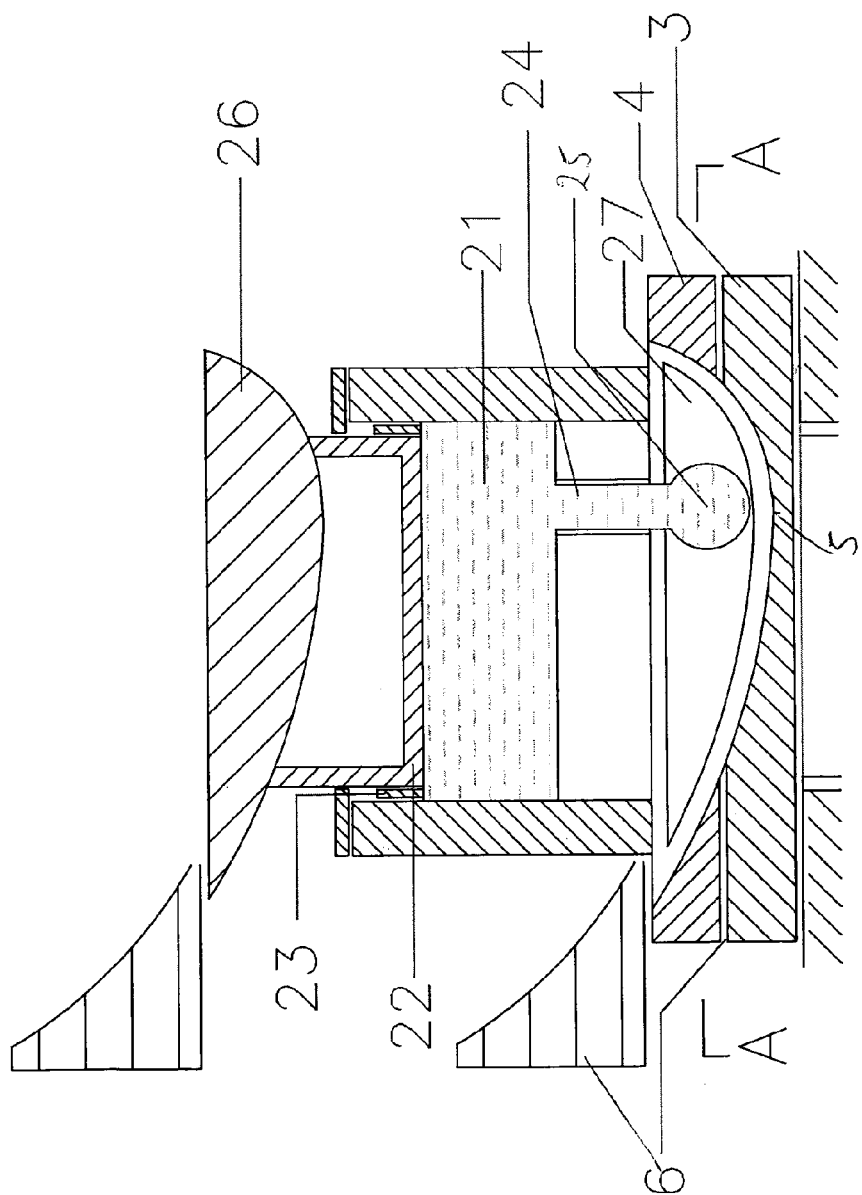
FIG. 4 is a sectional view.
Figure 5:
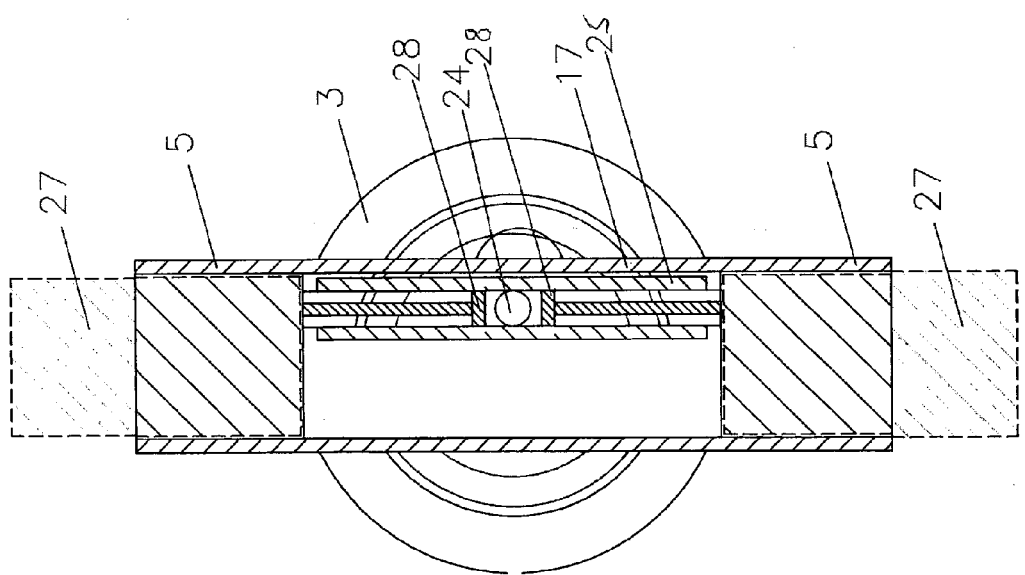
FIG. 5 is a plan view at A-A in FIG. 4 of means for increasing the effective area of the hydrofoils in the invention when the tide is flowing.

In FIGS. 4 and 5, hydrofoil 5 with its bearing 4 can rotate on collar 3 on the upwards extension of plug 1, so as to face into the tidal stream under the influence of tailplane 6, in the same way as has been shown in FIG. 3. 21 is a cylindrical oil reservoir inside the extension, within which is fitted piston head 22 with its sealing ring 23. 24 is a conduit for oil to pass from reservoir 21 to hydraulic ram 25, which is inside hydrofoil 5. 26 is a secondary hydrofoil, mounted on piston head 22, which has slightly positive buoyancy and which, like hydrofoil 5, produces downwards thrust from the tidal flow. 27, 27 are hydrofoil blade extensions which are slidably inserted into hydrofoil 5 and connected to pistons 28, 28 in ram 25.

In operation, when the tide flows, secondary hydrofoil 26 causes piston head 22 to force oil from reservoir 21 into hydraulic ram 25. This forces pistons 28, 28 apart, to move hydrofoil blade extensions 27, 27 outwards. This increases the effective area of foil on which the flow can act, and the downwards force generated. When the tide ceases to flow, the slight buoyancy in secondary hydrofoil 26 causes piston head 22 on which it is mounted, to move upwards. This sucks oil out of hydraulic ram 25 back into reservoir 21, thus withdrawing blade extensions 27, 27 back into hydrofoil 5.

Figure 6:
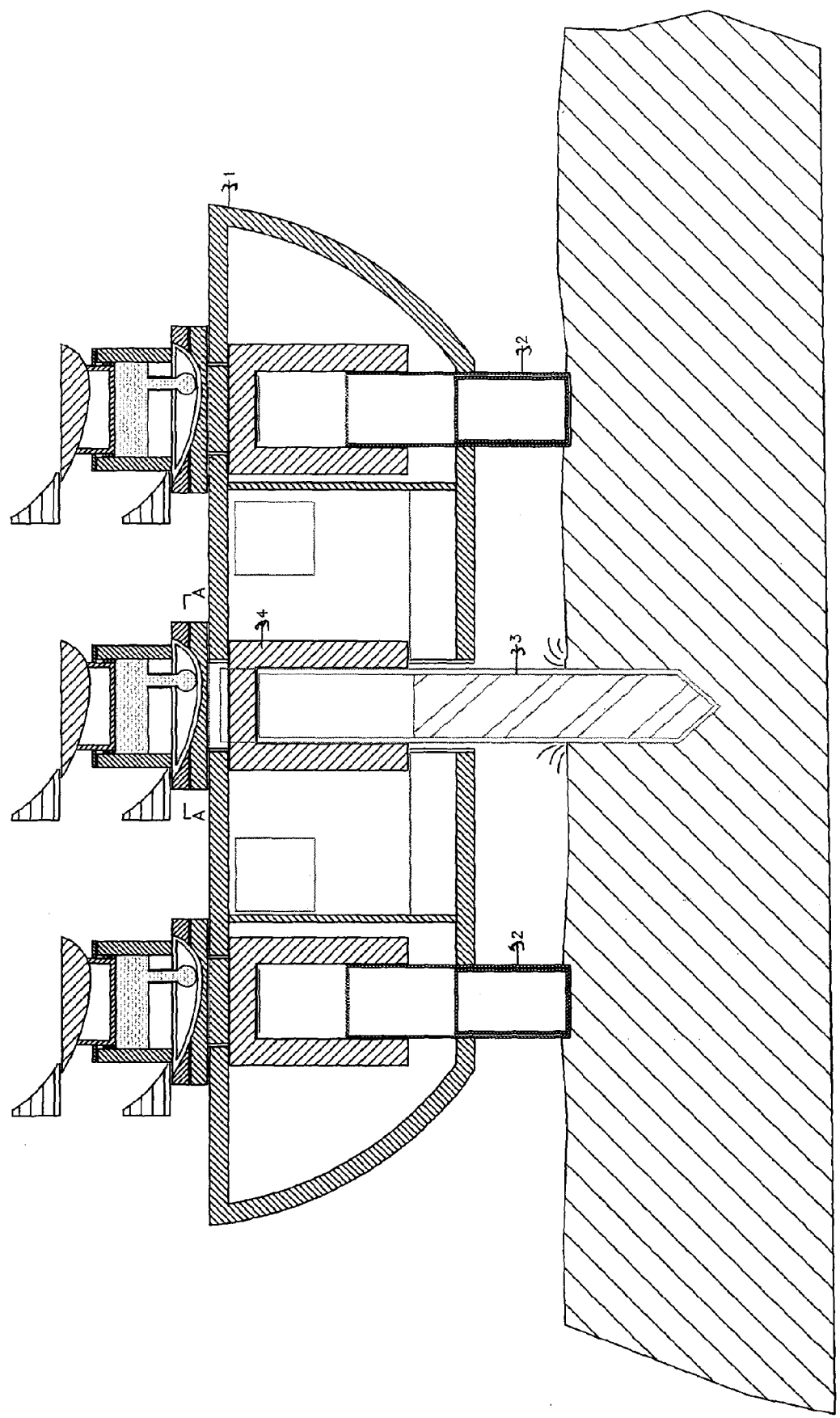
FIG. 6 is a sectional view of a submersible vessel which is used in the method of making the sockets of the invention in a hard sea bed.

For making sockets 2 when the sea bed is rock, FIG. 6 shows a submersible vessel 31 which has a number of adjustable hydraulic supports 32 to enable it to be positioned in a level position, aligned with the tidal flow, on the sea bed. 33 is a ground-penetrating apparatus such as a drill, powered by a conventional motor 34. The deck of vessel 31 carries a number of hydrofoil assemblies as previously described in relation to FIGS. 4 and 5, which deliver downwards force on vessel 1 when the tide is flowing, to enable the sea-bed to be penetrated by apparatus 33.

In operation, submersible vessel 31, which may be remotely operated, is directed to the point on the sea bed where drilling is to be carried out. It will then be held just over this point during the last stage of a tidal flow cycle, to align it with the flow. At the tidal null point, its ballast tanks and telescopic legs 32 are operated so that it settles horizontally on the sea bed in normal operation. If for any reason drilling at an angle is needed, differential adjustment of the length of these legs can be used to achieve this. As the flow commences in the new direction, the hydrofoils, turn to face into it, and when the flow accelerates, they begin to generate downwards force, which will be from the expanded foil area if the arrangement described above is being used. Drilling can then commence, made possible by this downward force, until towards the end of a tidal cycle. When drilling has been completed, vessel 1 can then be moved to a new drilling location. Otherwise, when the flow starts again, its hydrofoils will rotate so as to face into its new direction, and another cycle of drilling can begin.

FIGS. 7 and 8 show how sockets 2 may not only be made, but may also be given necessary additional support, in a sea bed which is made of relatively soft material such as sediment. In a submersible vessel 41, 42, 42, 42 are holes penetrating vertically through its hull, and 43, 43, 43 are typical tubes which can pass through these holes. 44 is a vertical slot which also passes through the vessel from deck to keel. Connecting rods 45, 45 join tubes 43, 43, 43, together, and can pass through vertical slot 44. In FIG. 8, tubes 43 have multiple holes, typically indicated at 46, 46, 46, around the circumference of their upper ends through which removable locking members indicated as 47, 47, 47 can pass to secure them to the hull of the vessel and to transmit its weight to them. Augur 48 and tube liner 49 are disposed on sliding racks (not shown) between watertight bulkheads 50, 50 in such a way that they can be moved into position coaxially with one of the three vertical holes in the vessel when required. Tube liner 49 may have accessories such as electrical and retrieval cables attached to it. 51, 51 indicate spaces for the ballast tanks and pumping and other gear of the vessel. Hydrofoil assemblies as shown in FIGS. 4 and 5 can also be added to the deck of vessel 41 to perform the same function as in the submersible which is used for making sockets in rock, previously described.

In operation, a servicing boat cranes tubes 43, connected by their rods 45, into the holes 42 and slot 44 of the vessel 41 when it is at the surface, and lowers them until they can be locked in position by passing members 47 into their holes 46. As a tidal null point approaches, water is allowed into the ballast tanks of vessel 41 so that it sinks to the sea bed. Vessel 41 will align itself with the residual tidal current, so that when its weight forces tubes 43 into the sea bed they will be in the plane of the tidal stream.

Locking members 47 can then be removed from the middle tube of the three embedded tubes to allow augur 48 to be moved into position to extract the sea bed material inside this tube, after which tube liner 49 can be moved into position in turn, so that it can be inserted into this tube and fixed in place, typically be grouting.

Locking members 47 are then withdrawn from the upper ends of the other two tubes, 4leaving vessel 41 free to return to the surface to be recharged, which it will most conveniently do at the next tidal null point.

In the anchor it then has left behind on the sea bed, connecting rods 45 help middle tube 43 to resist lateral movement under the force of the tide on the turbine, when the plug which anchors the latter has been inserted into tube liner 49.

In the version of the invention which is used when the hydrostatic pressure at the sea bed is high enough to bring about embedment of the tubes, tubes 43 are capped and the system includes a pump to extract water from them, and also means for disconnecting this pump when it is desired to return vessel 41 to the surface. As well as this, the invention includes means for removing the cap of the middle tube to allow augur 48 to remove the sea-bed material inside it in preparation for the insertion of socket liner 49. One way of achieving this is to have a screw cap and an O-ring seal on the top of the tube.

The means for unscrewing this cap can be moved into position on tracks in the same way as augur 48 and liner 49.

It will be clear that several techniques already well known to the offshore engineering industry could be used in the practical application of this invention. For example, vessels 31 and 41 could be fitted with GPS-controlled thrusters so as to maintain station during times of tidal flow, and to move between designated sites for the turbines in a tidal energy farm before needing to return to the surface. Also, by miniaturisation so as to allow multiples of smaller piles and their connectors to be carried on these vessels, cables or pipes could be pinned or stapled to the sea bed so as to transmit the ocean energy to land without the expense of trenching.

LISTING OF REFERENCES

US Patent Documents

U.S. Pat. No. 4,029,039
U.S. Pat. No. 6,719,496
U.S. Pat. No. 7,275,891

Foreign Patent Documents

GB 1131856
WO2007086037
EP0045613

The invention claimed is:

1. A hydrofoil anchoring system for use in a tideway comprising:
   a socket disposed in the sea-bed of a tideway;
   an anchor equipped with a plug to lock the anchor into said socket when the anchor is inserted therein; said anchor further equipped with
   a first and a second hydrofoil to translate force from tidal flow into downward pressure to assist in the adherence of said anchor to said sea-bed; each of the first and second hydrofoils comprise
      a substantially horizontal plane to which the hydrofoils are rotatable about, wherein the substantially horizontal plane is substantially parallel to said sea-bed;
      a flow reversal means to rotate the hydrofoils to face into the force of said tidal flow;
      a wingspan modifying means to increase or decrease the effective surface area of the first hydrofoil, wherein said wingspan modifying means is actuated by the force of said tidal flow acting on the second hydrofoil.

2. The hydrofoil anchoring system according to claim 1, wherein said hydrofoils are of non-symmetrical cross-section.

3. The hydrofoil anchoring system according to claim 1, wherein said flow reversal means further comprises a vertical tailplane.

4. The hydrofoil anchoring system according to claim 1, wherein said wingspan modifying means further comprises hydrofoil blade extensions.

5. The hydrofoil anchoring system according to claim 1, wherein the force from tidal flow is transmitted between said first and second hydrofoils via a hydraulic means.

* * * * *